United States Patent
Hu et al.

(10) Patent No.: US 9,893,931 B2
(45) Date of Patent: Feb. 13, 2018

(54) CONNECTION RECOVERY METHOD, APPARATUS, AND SYSTEM

(71) Applicant: Huawei Technologies Co., Ltd., Shenzhen (CN)

(72) Inventors: Bin Hu, Shenzhen (CN); Xin Chen, Shenzhen (CN); Mingyuan Xu, Nanning (CN); Qiang Yan, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 100 days.

(21) Appl. No.: 14/978,947

(22) Filed: Dec. 22, 2015

(65) Prior Publication Data
US 2016/0112250 A1    Apr. 21, 2016

Related U.S. Application Data

(63) Continuation of application No. PCT/CN2013/078478, filed on Jun. 29, 2013.

(51) Int. Cl.
| | |
|---|---|
| H04L 12/28 | (2006.01) |
| H04L 12/24 | (2006.01) |
| H04L 29/08 | (2006.01) |
| H04L 29/14 | (2006.01) |
| H04L 12/26 | (2006.01) |

(52) U.S. Cl.
CPC ......... *H04L 41/0668* (2013.01); *H04L 43/50* (2013.01); *H04L 67/16* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 5,513,345 A | 4/1996 | Sato et al. | |
| 6,075,766 A * | 6/2000 | Croslin | H04L 41/0663 370/225 |
| 6,442,614 B1 * | 8/2002 | Rahman | H04L 12/2801 370/227 |
| 8,180,891 B1 * | 5/2012 | Harrison | H04L 63/10 709/224 |

(Continued)

FOREIGN PATENT DOCUMENTS

| | | |
|---|---|---|
| CN | 101459689 A | 6/2009 |
| WO | 9824244 A2 | 6/1998 |

OTHER PUBLICATIONS

Tao, S., et al., "ICE negotiation when page reload in rtcweb," draft-li-rtcweb-ice-page-reload-02, Oct. 22, 2012, 7 pages.

(Continued)

*Primary Examiner* — Anh-Vu Ly
(74) *Attorney, Agent, or Firm* — Conley Rose, P.C.

(57) ABSTRACT

A connection recovery method includes searching, by a first terminal, for a recovery candidate corresponding to an interrupted connection; selecting, by the first terminal, one found recovery candidate as a first recovery candidate; sending, by the first terminal, a negotiation request to a second terminal; receiving, by the first terminal, a matching success message returned by the second terminal; and transmitting, by the first terminal, data to the second terminal according to the first connection information.

20 Claims, 10 Drawing Sheets

(56) References Cited

U.S. PATENT DOCUMENTS

| | | | |
|---|---|---|---|
| 2002/0174232 A1* | 11/2002 | Kikuta | H04Q 11/04 709/227 |
| 2004/0103210 A1 | 5/2004 | Fujii et al. | |
| 2007/0178888 A1* | 8/2007 | Alfano | H04W 76/028 455/414.1 |
| 2007/0234113 A1* | 10/2007 | Komatsu | G06F 11/201 714/6.13 |
| 2009/0172460 A1* | 7/2009 | Bobak | G06F 11/0709 714/2 |
| 2009/0216887 A1 | 8/2009 | Hertle et al. | |
| 2011/0047219 A1* | 2/2011 | Tripathi | H04L 12/581 709/206 |

OTHER PUBLICATIONS

Rosenberg, J., et al., "Interactive Connectivity Establishment (ICE): A Protocol for Network Address Translator (NAT) Traversal for Offer/Answer Protocols," Apr. 2010, 117 pages.

Foreign Communication From a Counterpart Application, PCT Application No. PCT/CN2013/078478, English Translation of International Search Report dated Apr. 3, 2014, 2 pages.

Foreign Communication From a Counterpart Application, PCT Application No. PCT/CN2013/078478, English Translation of Written Opinion dated Apr. 3, 2014, 7 pages.

Foreign Communication From a Counterpart Application, European Application No. 13887638.8, Extended European Search Report dated Jun. 1, 2016, 8 pages.

* cited by examiner

Data structure of a recovery candidate

CONNECTION RECOVERY METHOD, APPARATUS, AND SYSTEM

CROSS-REFERENCE TO RELATED APPLICATIONS

This application is a continuation of International Application No. PCT/CN2013/078478, filed on Jun. 29, 2013, which is hereby incorporated by reference in its entirety.

TECHNICAL FIELD

The present disclosure relates to the field of communications, and in particular, to a connection recovery method, apparatus, and system.

BACKGROUND

A network address translation (NAT) is a translation technology that converts a private address into a public Internet Protocol (IP) address, and is widely applied to various types of network access manners and various types of networks. As a common comprehensive NAT traversal technology, interactive connectivity establishment (ICE) can integrate various NAT traversal technologies to enable a Session Initiation Protocol (SIP)-based client to traverse a firewall.

A main process of ICE includes collecting address information of both communication parties; exchanging the address information of both communication parties; performing matching on the address information of both communication parties, forming a connectivity test list, and for address pairs in the list, sequentially determining connectivity of the address pairs using four handshakes. An optimal network route is selected according to a connectivity test result and a selection standard.

When a connection is interrupted due to a client crash, a user misoperation or the like, both communication parties need to perform connection recovery according to the foregoing ICE process; address collection and a connectivity test still need to be performed for both communication parties, thereby leading to long connection recovery time, and severely affecting user experience.

SUMMARY

The present disclosure is intended to provide a connection recovery method, apparatus, and system, so as to increase a speed of completing connection recovery after a connection is interrupted.

According to a first aspect, an embodiment of the present disclosure provides a connection recovery method, where the method includes searching, by a first terminal, for a recovery candidate corresponding to an interrupted connection, where the recovery candidate includes connection information and a recovery identifier used to identify the connection information; selecting, by the first terminal, one found recovery candidate as a first recovery candidate, where the first recovery candidate includes a first recovery identifier and first connection information; sending, by the first terminal, a negotiation request to a second terminal, where the negotiation request includes the first recovery identifier of the selected first recovery candidate; receiving, by the first terminal, a matching success message returned by the second terminal, where the matching success message is used to indicate that the second terminal finds a second recovery candidate that has a same recovery identifier as the first recovery candidate; and after receiving the matching success message, transmitting, by the first terminal, data to the second terminal according to the first connection information.

In a first possible implementation manner of the first aspect, the recovery candidate further includes generation time, and when a quantity of recovery candidates that are corresponding to the interrupted connection and found by the first terminal is greater than or equal to two, the first recovery candidate is a recovery candidate with latest generation time.

According to a second aspect, an embodiment of the present disclosure further provides a connection recovery terminal, including a searching unit configured to search for a recovery candidate corresponding to an interrupted connection, where the recovery candidate includes connection information and a recovery identifier used to identify the connection information; and use one found recovery candidate as a first recovery candidate, where the first recovery candidate includes a first recovery identifier and first connection information; a negotiation request sending unit configured to send a negotiation request to a second terminal, where the negotiation request includes the first recovery identifier of the selected first recovery candidate; a matching message receiving unit configured to receive a matching success message returned by the second terminal, where the matching success message is used to indicate that the second terminal finds a second recovery candidate that has a same recovery identifier as the first recovery candidate; and a data transmission unit configured to transmit data to the second terminal according to the first connection information.

In a first possible implementation manner of the second aspect, the recovery candidate further includes generation time, and when a quantity of recovery candidates that are corresponding to the interrupted connection and found by the searching unit is greater than or equal to two, the searching unit is configured to use a recovery candidate with latest generation time as the first recovery candidate.

According to a seventh aspect, an embodiment of the present disclosure further provides a connection recovery system, including at least a first terminal and a second terminal, where the first terminal is configured to search for a recovery candidate corresponding to an interrupted connection, where the recovery candidate includes connection information and a recovery identifier used to identify the connection information; select one found recovery candidate as a first recovery candidate, where the first recovery candidate includes a first recovery identifier and first connection information; and send a negotiation request to the second terminal, where the negotiation request includes the first recovery identifier of the selected first recovery candidate; the second terminal is configured to search for a second recovery candidate that has a same recovery identifier as the first recovery candidate, and return a matching success message to the first terminal; and the first terminal and the second terminal transmit data to each other according to the first connection information and second connection information respectively.

In a first possible implementation manner of the seventh aspect, the connection information includes a local-end address and port and a peer-end address and port that are required for data transmission, and the first terminal is further configured to extract a local-end address and port and a peer-end address and port from the first connection information, and transmit the data to the second terminal.

According to the embodiments provided in the present disclosure, the present disclosure discloses the following technical effects.

In the embodiments of the present disclosure, after a communication connection is interrupted, either of two communication parties initiates a connection recovery process, searches for a pre-stored first recovery candidate corresponding to the connection, acquires a first recovery identifier and first connection information from the first recovery candidate, and sends the first recovery identifier to a second terminal, such that the second terminal may find, according to the first recovery identifier, a second recovery candidate that has a same recovery identifier as the first recovery candidate, thereby completing recovery candidate negotiation between both communication parties, such that both parties may perform data transmission using the connection information in the recovery candidates determined by means of negotiation. Using the foregoing manner, in the embodiments of the present disclosure, two time-consuming operations, namely, an address collection process and a connectivity test on a collected valid address, do not need to be performed in a connection recovery process, thereby accelerating connection recovery after abnormal disconnection.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
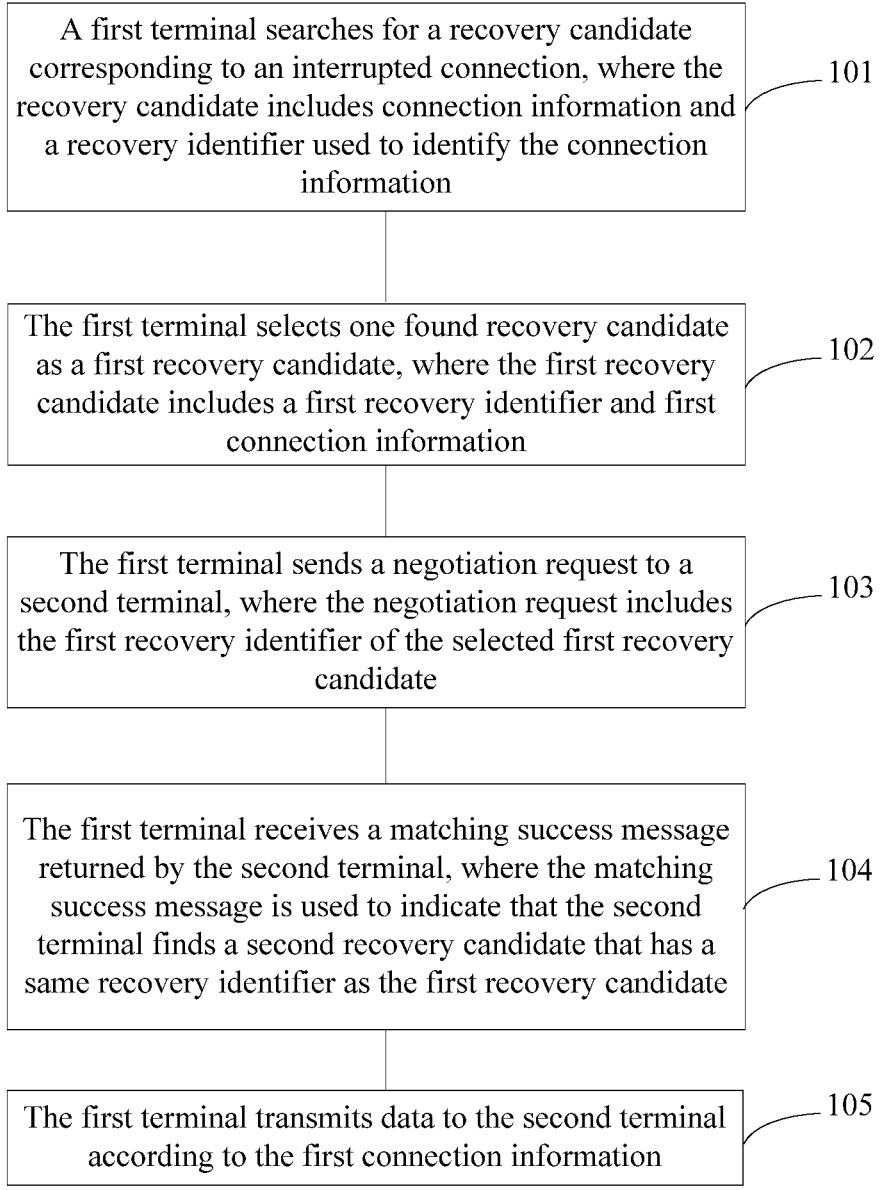
FIG. 1 is a schematic flowchart of a connection recovery method according to an embodiment of the present disclosure.

As shown in FIG. 1, FIG. 1 is a schematic flowchart of a connection recovery method according to an embodiment of the present disclosure, including the following steps.

Step 101: A first terminal searches for a recovery candidate corresponding to an interrupted connection, where the recovery candidate includes connection information and a recovery identifier used to identify the connection information.

Step 102: The first terminal selects one found recovery candidate as a first recovery candidate, where the first recovery candidate includes a first recovery identifier and first connection information.

Step 103: The first terminal sends a negotiation request to a second terminal, where the negotiation request includes the first recovery identifier of the selected first recovery candidate.

Step 104: The first terminal receives a matching success message returned by the second terminal, where the matching success message is used to indicate that the second terminal finds a second recovery candidate that has a same recovery identifier as the first recovery candidate.

Step 105: After receiving the matching success message, the first terminal transmits data to the second terminal according to the first connection information.

In the embodiment of the present disclosure, after a communication connection is interrupted, either of two communication parties initiates a connection recovery process, searches for a pre-stored first recovery candidate corresponding to the connection, acquires a first recovery identifier and first connection information from the first recovery candidate, and sends the first recovery identifier to a second terminal, such that the second terminal may find, according to the first recovery identifier, a second recovery candidate that has a same recovery identifier as the first recovery candidate, thereby completing recovery candidate negotiation between both communication parties, such that both parties may perform data transmission using the connection information in the recovery candidates determined by means of negotiation. Using the foregoing manner, in the embodiment of the present disclosure, two time-consuming operations, namely, an address collection process and a connectivity test on a collected valid address, do not need to be performed in a connection recovery process, that is, negotiation on a communicable address and port does not need to be performed, thereby accelerating connection recovery after abnormal disconnection.

It should be noted that, for a purpose of differentiation, in the embodiment of the present disclosure, a recovery candidate stored on a first terminal side is used as a first recovery candidate, a recovery candidate stored on a second terminal side is used as a second recovery candidate, the first recovery candidate includes a first recovery identifier and first connection information, and the second recovery candidate includes a second recovery identifier and second connection information. In a process of recovery candidate negotiation, if the first recovery candidate and the second recovery candidate match successfully (that is, the first recovery identifier is the same as the second recovery identifier), the first connection information and the second connection information are also in a mapping relationship, and the first connection information and the second connection information are an address and a port that are used when the first terminal and the second terminal transmit data to each other before the connection is interrupted.

Figure 2:
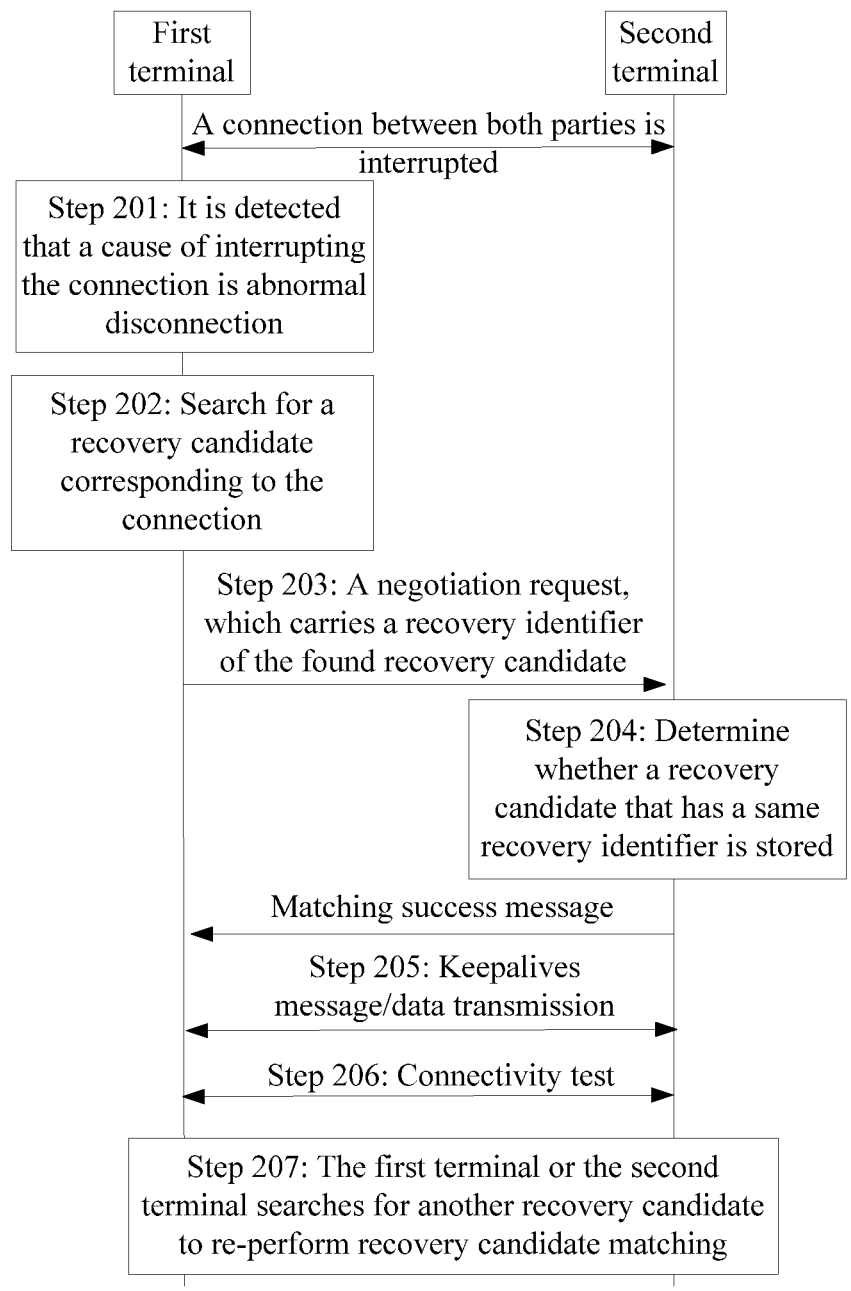
FIG. 2 is a schematic flowchart of another connection recovery method according to an embodiment of the present disclosure.

As shown in FIG. 2, FIG. 2 is a schematic flowchart of another connection recovery method according to an embodiment of the present disclosure, where the method includes the following steps.

Step 201: A connection between two communication parties (communication between a first terminal and a second terminal is used as an example) is interrupted in a communication process, the first terminal detects that a cause of interrupting the connection is abnormal disconnection, and the first terminal initiates a connection recovery process.

In a scenario, the communication process may be point-to-point video communication. After the point-to-point video communication is terminated due to a misoperation by a user of the first terminal (for example, browser refreshing), or a software fault in the first terminal, the first terminal determines that the communication connection is abnormally interrupted, and initiates a connection recovery process. The first terminal is an initiator of the connection recovery.

It should be noted that, the cause of the interrupted connection may be detected using the prior art, for example, detection by means of mouse movement, which is not limited in the embodiment of the present disclosure.

Step 202: The first terminal searches for a recovery candidate corresponding to the connection, and determines whether the connection supports fast recovery. If the first terminal finds a recovery candidate, it indicates that the connection supports fast recovery, and the first terminal selects one recovery candidate from stored recovery candidates to perform a connection recovery operation; if the terminal cannot find a recovery candidate, it indicates that the connection does not support fast recovery, and a standard ICE process is executed to perform the connection recovery.

The recovery candidate includes at least the following content: a recovery identifier, and an address and a port (namely connection information) that are used when the first terminal or the second terminal transmits data using the connection before the connection is interrupted.

It should be noted that the recovery candidate is preferentially stored locally on the first terminal. Content of the recovery candidate may further include generation time. When a quantity of recovery candidates that are corresponding to the interrupted connection and found by the first terminal is greater than or equal to two, the first terminal preferentially selects a recovery candidate with latest generation time for the connection recovery.

Further, in an application scenario, multiple applications may run on the first terminal or the second terminal, where each application includes multiple users, and each user in each application is allocated with a unique user identifier. In order to identify an abnormally interrupted connection, an application and a user that use the connection for communication, and addresses and ports of both ends of the connection need to be identified. Therefore, in addition to the connection information, the recovery identifier, and the generation time, the recovery candidate may further include an application identifier (App id) and a user identifier (user id). More specifically, when the user identifier is unique in all applications, the recovery candidate may not include the application identifier; when the user identifier is unique in an individual application, the recovery candidate includes the application identifier. It should be noted that, when data transmission may be performed between different applications, application identifiers in recovery candidates stored by both communication parties may be different, which is not limited in the present disclosure.

Step 203: The first terminal sends a negotiation request to the second terminal, where the negotiation request includes a recovery identifier of the found recovery candidate.

In a scenario, the first terminal may send an identifier of the selected recovery candidate to the second terminal using an Offer message. More specifically, in an extended type attribute (namely, an ice-options attribute) of the Offer message, "ice-options: recovery" is used to indicate that the Offer message is a negotiation request; in addition, an identifier field (namely, an ice-recovery-id field) is added to the Offer message, where the field is used to carry the recovery identifier of the recovery candidate.

Some content of an extended Offer message provided by the embodiment of the present disclosure is shown in the following example, where the ice-options attribute and the ice-recovery-id field are included.

```
v=0
o=- 4252590694 2 IN IP4 127.0.0.1
s=-
t=0 0
a=group:BUNDLE audio video
a=msid-semantic: WMS 32KSiGEuoocLuCIbBrSRbJhBuWQhL09C5O0C
m=audio 1 RTP/SAVPF 111 103 104 0 8 107 106 105 13 126
c=IN IP4 0.0.0.0
a=rtcp:1 IN IP4 0.0.0.0
a=ice-ufrag:Dq2Hm+ngyeZfFb8D
a=ice-pwd:XqxuEiWD74InoOWCFcmKMc9M
a=ice-options:recovery
a=ice-recovery-id: ak83iLWzr0sfd62Pld5kg
a=sendrecv
...
```

In a scenario, the negotiation request further includes the application identifier and the user identifier.

It should be noted that, in this step, the first terminal and the second terminal may establish a signaling connection using an application server, so as to implement recovery candidate negotiation, or may use another existing manner, which is not limited in the present disclosure.

Step 204: The second terminal receives the negotiation request, and determines, according to the received recovery identifier of the recovery candidate, whether a recovery candidate with an identifier the same as the recovery identifier is stored; if yes, the second terminal returns a matching success message to the first terminal, where the matching success message is used to indicate that matching of recovery identifiers is successful, and the process proceeds to step 205; if not, the second terminal returns a failure message to the first terminal, where the failure message is used to instruct the first terminal to initiate a standard ICE process to perform the connection recovery.

The recovery candidate may be stored locally on the second terminal or stored on a network side device in which the second terminal may perform query.

Further, the matching success message or matching failure message may use an Answer message. In the embodiment of the present disclosure, a recovery identifier matching result is carried by extending the Answer message. For example, an ice-options attribute is also extended in the Answer message, where the ice-options attribute is used to indicate that the Answer message is a fast recovery response, and a field ice-recovery-response is added to the Answer message, where the field is used to indicate a recovery identifier searching result. When a value of the ice-recovery-response is OK, it indicates that the searching is successful, that is, the second terminal also finds a recovery candidate with an identifier the same as the recovery identifier that is of the recovery candidate and carried in the negotiation request; when the value of the ice-recovery-response is ERROR, it indicates that the searching fails, a recovery candidate with a recovery identifier the same as the recovery identifier that is of the recovery candidate and carried in the negotiation request message is not found on a second terminal side, and the answer does not carry any candidate information.

Some content of an extended Answer message provided by the embodiment of the present disclosure is shown in the following example:

```
v=0
o=- 1914227327 2 IN IP4 127.0.0.1
s=-
t=0 0
a=group:BUNDLE audio video
a=msid-semantic: WMS
c3E2b7ZmdY1jMTGsupAK8EG2cg1QZoZ4sV06
m=audio 1 RTP/SAVPF 111 103 104 0 8 107 106 105 13 126
c=IN IP4 0.0.0.0
a=rtcp:1 IN IP4 0.0.0.0
a=candidate:3051601105 1 udp 2113937151 10.166.41.134 60453
typ host generation
0
a=candidate:4217389089 1 tcp 1509957375 10.166.41.134 60747
typ host generation
0
a=ice-ufrag:Gyd8HOyLRA8gU4G8
a=ice-pwd:0izAaoCbwAlTaEuQO8huxETk
a=ice-options:recovery
a=ice-recovery-response:OK
a=sendrecv
...
```

Further, when the negotiation request further includes the application identifier and the user identifier, the second terminal searches a stored record that matches the application identifier and the user identifier to determine whether a recovery candidate that has a same recovery identifier is stored.

Step 205: The first terminal and the second terminal send a Keepalives message to each other and start to transmit a media stream. In this case, the media stream may be interworked theoretically.

In the embodiment of the present disclosure, after returning a success message to the first terminal, the second terminal extracts, from the recovery candidate found on a local end, a local-end address and port, and a peer-end address and port that are used for data transmission, and sends a Keepalives message and a media stream to the first terminal; after receiving the success message, the first terminal sends a Keepalives message and a media stream to a peer-end address and port included in a recovery candidate found on a local end.

In the embodiment of the present disclosure, because the first terminal stores the recovery candidate corresponding to the abnormally interrupted connection, the first terminal does not need to access a Session Traversal Utilities for NAT/Traversal Using Relay NAT (STUN/TURN) server to collect address information, thereby reducing pressure of the STUN/TURN server. When the connection of both parties is abnormally interrupted due to other causes such as a user misoperation or a client software fault, the first terminal may read the connection information included in the stored recovery candidate, and preferentially select the connection information for data transmission. Using the foregoing manner, in the embodiment of the present disclosure, two time-consuming operations, namely, an address collection process and a connectivity test on a collected valid address, do not need to be performed in a connection recovery process, thereby accelerating connection recovery after abnormal disconnection.

Further, if a network environment changes after the connection is abnormally interrupted, the addresses and the ports that are of both parties of the connection and stored in the recovery candidate may not be available. Therefore, before step 205, the connection recovery method further includes the following steps.

Step 206: The first terminal and the second terminal perform connectivity test on the connection information included in the recovery candidate. If the test fails, the recovery candidates that are corresponding to the recovery identifier and stored on both parties are deleted, and an error processing process, namely, step 207, is executed. It should be noted that the connectivity test may use a test method in the standard ICE process, which is not limited in the present disclosure.

Step 207: An initiator deletes a recovery candidate corresponding to the recovery identifier used in the connection recovery this time, and continues to check whether there is another recovery candidate. If there is another recovery candidate, step 202 to step 204 are repeated until a valid recovery candidate is found, or all recovery candidates are invalid; if another recovery candidate does not exist, the initiator initiates a standard ICE reconnection process.

In the foregoing embodiment of the present disclosure, another recovery candidate is used to perform the connection recovery only in a case in which a recovery candidate preferentially selected by the recovery initiator does not pass the connectivity test. In addition to ensuring connection recovery efficiency, the foregoing manner can increase a success rate of the connection recovery to the greatest extent.

Figure 3:
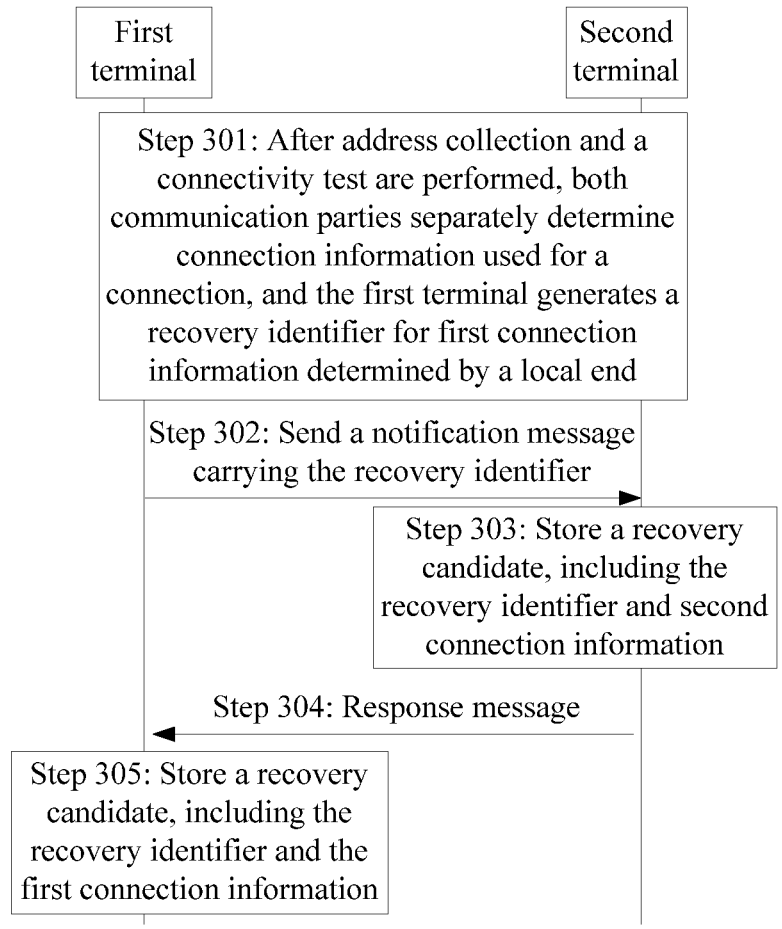
FIG. 3 is a schematic flowchart of a method for generating a recovery candidate according to an embodiment of the present disclosure.

Before the connection is interrupted, determined connection information needs to be stored (that is, to generate a recovery candidate) in a process of establishing the connection. As shown in FIG. 3, FIG. 3 is a schematic flowchart of a method for generating a recovery candidate according to an embodiment of the present disclosure, where the method includes the following steps.

Step 301: In a process of establishing a connection between two communication parties, both communication parties perform address collection, and send collected local-end address information to a peer end. Both communication parties perform a connectivity test according to acquired address information of both parties, and determine an optimal route used for the communication connection. After a connectivity test stage ends, a first terminal generates a recovery identifier (recovery id) for first connection information that passes the connectivity test.

Figure 4:
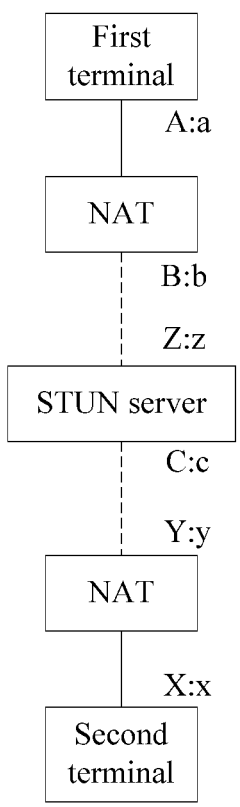
FIG. 4 is a schematic diagram of a communication connection according to an embodiment of the present disclosure.

As shown in FIG. 4, FIG. 4 is a schematic diagram of a communication connection according to an embodiment of the present disclosure, where a first terminal and a second terminal are connected through a STUN server using respective NATs. A:a indicates an internal address and an internal port of the first terminal, B:b indicates an external address and an external port of the first terminal in a first NAT, and C:c indicates a relay address and a relay port of the first terminal on the STUN server. X:x indicates an internal address and an internal port of the second terminal, Y:y indicates an external address and an external port of the second terminal in a second NAT, and Z:z indicates a relay address and a relay port of the second terminal on the STUN server.

The first terminal and the second terminal send an address acquiring request to the STUN server to collect respective address information, where the address information collected by the first terminal is A:a, B:b, and C:c, and the address information collected by the second terminal is X:x, Y:y, and Z:z. The first terminal and the second terminal exchange the collected address information, initiate a connectivity test process with respect to the addresses of both communication parties, and determine connection information for data transmission.

It should be noted that both communication parties may be separately located in different NATs, or located in a same NAT, or only one of the two parties is located in a NAT. Therefore, the addresses and ports of both communication parties included in the connection information may be internal network addresses and internal network ports, or may be external network addresses and external network ports, or may further be a relay address and a relay port of a TURN server. For an address collection process and connectivity test process, reference may be made to a standard ICE process, which is not limited in the present disclosure.

Step 302: The first terminal adds the recovery identifier to a notification message and sends the notification message to the peer end, to instruct a second terminal to use the received recovery identifier as a recovery identifier of connection information recorded on a local end. A STUN request message may be preferentially selected as the notification message, and the recovery identifier may be carried in the STUN request message in a manner of extending a message body.

The embodiment of the present disclosure further provides an extension instance of a STUN message, and the following shows a schematic diagram of a RECOVERY attribute format in an extended STUN message provided in the embodiment of the present disclosure.

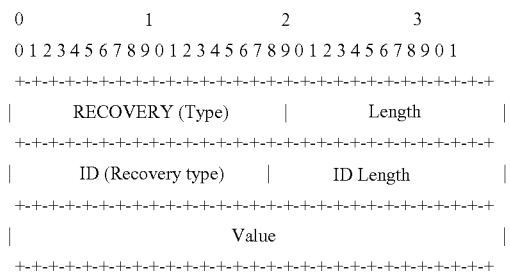

The STUN message is extended in the embodiment of the present disclosure, a RECOVERY attribute is added to the STUN message, and a recovery identifier (also called a recovery ID) is carried in the RECOVERY attribute.

Further, a value of the RECOVERY attribute is 0x0050, and a Length attribute is further included thereafter, where the Length attribute is used to indicate a length of the RECOVERY attribute. Preferentially, the length of the RECOVERY attribute is 16 bits. Further, the RECOVERY attribute may include one or more sub-attributes.

It should be noted that the embodiment of the present disclosure is not limited to the STUN message, as long as the recovery identifier is sent to the peer end to implement that both communication parties store connection information that includes the same recovery identifier.

Step 303: After receiving the notification message, the second terminal uses the received recovery identifier as a recovery identifier of second connection information that passes the connectivity test and that is recorded on the local end, and stores the recovery identifier and the second connection information as a recovery candidate locally or in a storage network element on a network side.

More specifically:

The recovery id is randomly generated by the first terminal in the process of establishing the connection, is unique, and is used as evidence for both parties to determine a same recovery candidate during the connection recovery.

The second connection information includes an address and port used for data transmission by the local end, and an address and port of the peer end, and is used to determine the addresses and ports of both communication parties during the connection recovery. It should be noted that the address or port used for data transmission by the local end or the peer end may belong to a public network or a private network, and is determined in an ICE negotiation process according to a network environment, which is not limited in the present disclosure.

Further, the recovery candidate further includes generation time, namely local time when the recovery candidate is generated. The generation time is used by a recovery initiator to search for a latest recovery candidate corresponding to the connection when initiating the connection recovery.

Still further, in an application scenario, multiple applications may run on the first terminal or the second terminal, where each application includes multiple users, and each user in each application is allocated with a unique user identifier. In order to identify an abnormally interrupted connection, an application and a user that use the connection for communication, and addresses and ports of both ends of the connection need to be identified. Therefore, in addition to the connection information, the recovery identifier, and the generation time, the recovery candidate may further include an app id and a user id. More specifically, when the user id is unique in all applications, the recovery candidate may not include the app id; when the user id is unique in an individual application, the recovery candidate includes the app id. It should be noted that, when data transmission may be performed between different applications, app ids in recovery candidates stored by both communication parties may be different, which is not limited in the present disclosure.

Step 304: The second terminal returns a response message to the first terminal.

Step 305: After receiving the response message returned by the second terminal, the first terminal stores the connection information and the recovery identifier as a recovery candidate locally or in a storage unit on a network side.

Further, the recovery candidate may further include at least one of generation time, a user identifier, and an application identifier. Content types of the recovery candidates stored by the first terminal and the second terminal may be consistent.

Figure 4A:
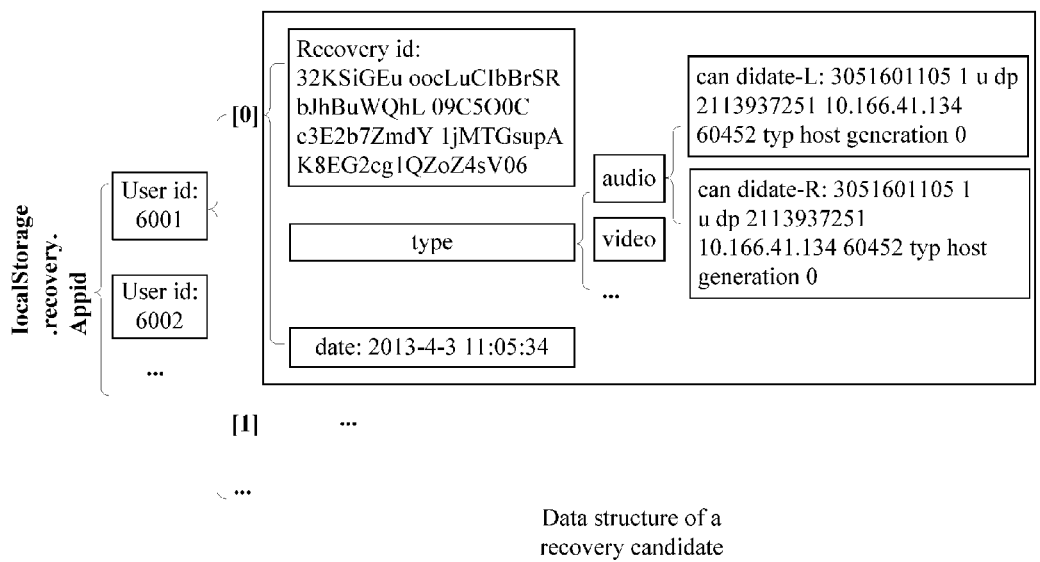
FIG. 4A is a schematic diagram of a format of a recovery candidate according to an embodiment of the present disclosure.

FIG. 4A shows a schematic diagram of a format of a recovery candidate stored using a HyperText Markup Language 5 (HTML5) LocalStorage technology according to an embodiment of the present disclosure. Candidate L indicates a local-end address and port of the connection information, and Candidate R indicates a peer-end address and port of the connection information.

It should be noted that the embodiment of the present disclosure does not impose a limit on a manner in which both communication parties store a recovery candidate.

The embodiment of the present disclosure provides a method for generating a recovery candidate, where generation of the recovery candidate is completed in a process of establishing a connection. After the connection is abnormally interrupted, a stored recovery candidate may be used to perform connection recovery.

Further, in order to maintain validity of recovery candidates stored by both communication parties, a recovery candidate management manner provided in the embodiment of the present disclosure includes at least one of the following manners.

Manner 1: In a connection recovery process, when the first terminal receives a matching failure message returned by the second terminal, the first terminal deletes a recovery candidate that fails in matching.

Manner 2: The first terminal and the second terminal perform a connectivity test on a recovery candidate that succeeds in matching, and delete a recovery candidate whose connectivity test result is a failure.

Manner 3: When the first terminal or the second terminal initiates an ICE Restart process to modify the connection information, the first terminal and the second terminal update connection information included in the respective stored recovery candidates to modified connection information.

Manner 4: After a session between the first terminal and the second terminal is terminated, the first terminal and the second terminal clear a recovery candidate stored in a process of this session.

Manner 5: A clearance period and keepalive duration are set, the first terminal or the second terminal performs periodical clearance on the stored recovery candidate, and clears, according to generation time of a recovery candidate, a recovery candidate with generation duration exceeding the keepalive duration.

Manner 6: After successfully recovering the connection using the recovery candidate, the first terminal and the second terminal update generation time of the recovery candidate.

In the embodiment of the present disclosure, two communication parties store a recovery candidate that is saved in a process of establishing a connection. When the connection between both parties is abnormally interrupted due to other causes such as a user misoperation or a client software fault, a first terminal may read connection information included in the stored recovery candidate, and preferentially select the connection information for data transmission. Using the foregoing manner, in the embodiment of the present disclosure, two time-consuming operations, namely, an address collection process and a connectivity test on a collected valid address, do not need to be performed in a connection recovery process, that is, negotiation on a communicable address and port does not need to be performed, thereby accelerating connection recovery after abnormal disconnection. Further, the embodiment of the present disclosure further provides the recovery candidate management manner, ensuring time validity of the recovery candidate.

Figure 5:
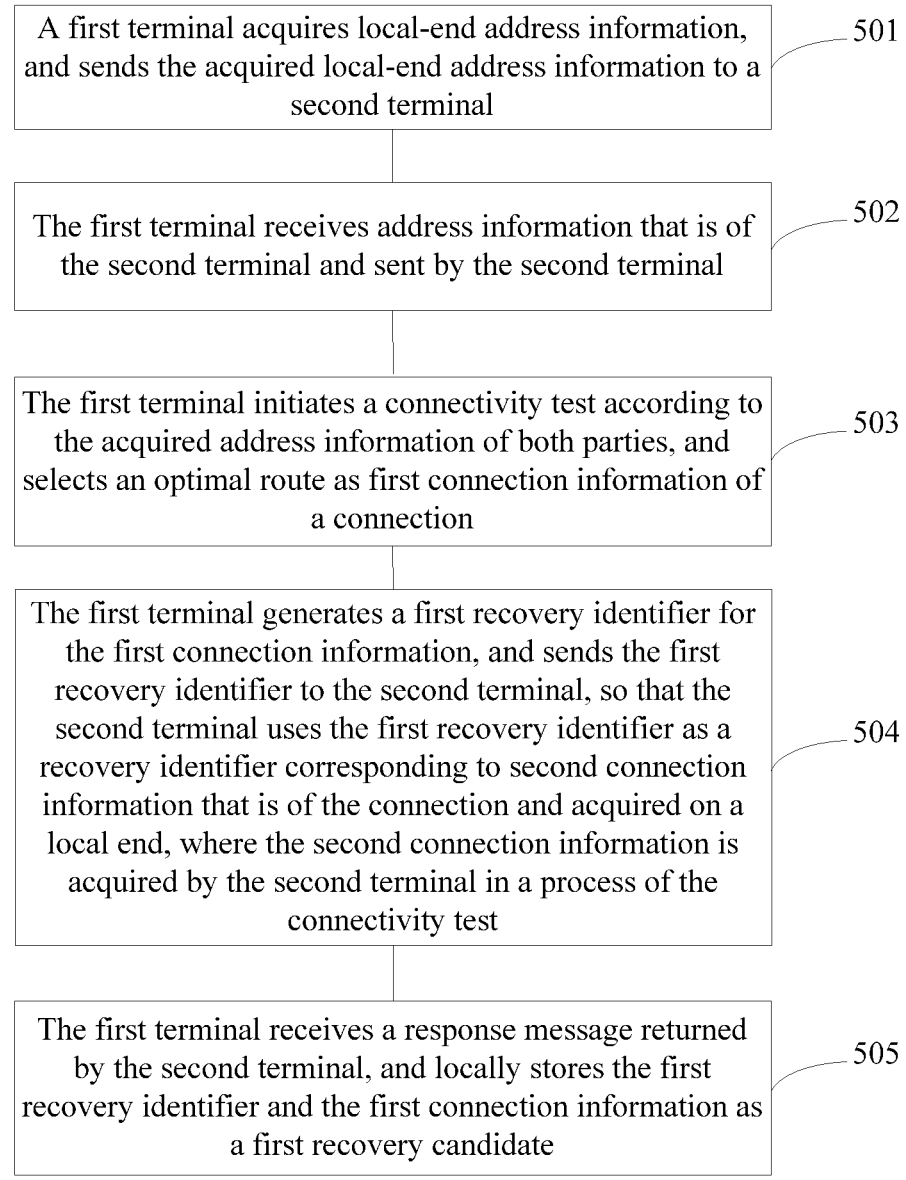
FIG. 5 is a schematic flowchart of a method for generating a recovery candidate in a process of establishing a connection according to an embodiment of the present disclosure.

As shown in FIG. 5, FIG. 5 is a schematic flowchart of a method for generating a recovery candidate in a process of establishing a connection according to an embodiment of the present disclosure, where the method includes the following steps.

Step 501: A first terminal acquires local-end address information, and sends the acquired local-end address information to a second terminal.

Step 502: The first terminal receives address information that is of the second terminal and sent by the second terminal.

Step 503: The first terminal initiates a connectivity test according to the acquired address information of both parties, and selects an optimal route as first connection information of the connection.

Step 504: The first terminal generates a first recovery identifier for the first connection information, and sends the first recovery identifier to the second terminal, such that the second terminal uses the first recovery identifier as a recovery identifier corresponding to second connection information that is of the connection and acquired on a local end, where the second connection information is acquired by the second terminal in a process of the connectivity test.

Step 505: The first terminal receives a response message returned by the second terminal, and locally stores the first recovery identifier and the first connection information as a first recovery candidate.

Figure 6:
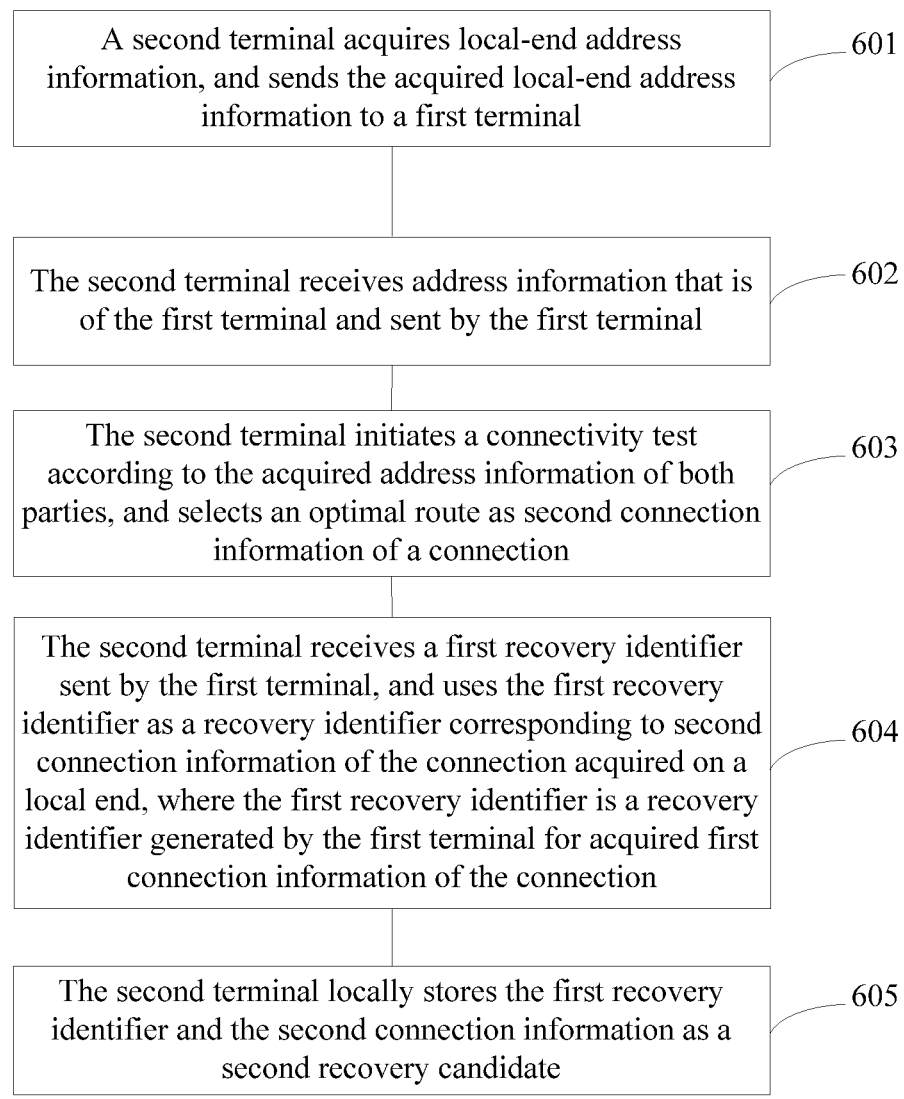
FIG. 6 is a schematic flowchart of another method for generating a recovery candidate in a process of establishing a connection according to an embodiment of the present disclosure.

As shown in FIG. 6, FIG. 6 is a schematic flowchart of another method for generating a recovery candidate in a process of establishing a connection according to an embodiment of the present disclosure, where the method includes the following steps.

Step 601: A second terminal acquires local-end address information, and sends the acquired local-end address information to a first terminal.

Step 602: The second terminal receives address information that is of the first terminal and sent by the first terminal.

Step 603: The second terminal initiates a connectivity test according to the acquired address information of both parties, and selects an optimal route as second connection information of the connection.

Step 604: The second terminal receives a first recovery identifier sent by the first terminal, and uses the first recovery identifier as a recovery identifier corresponding to second connection information that is of the connection and acquired on a local end, where the first recovery identifier is a recovery identifier generated by the first terminal for acquired first connection information of the connection.

Step 605: The second terminal locally stores the first recovery identifier and the second connection information as a second recovery candidate.

The embodiment of the present disclosure provides a method for generating a recovery candidate in a process of establishing a connection, where a first terminal generates a recovery identifier for connection information corresponding to an optimal route determined by two parties in a connectivity test process, and sends the recovery identifier to a second terminal, such that the second terminal allocates the recovery identifier to connection information that is determined by a local end for the connection. Both communication parties store a recovery candidate, including the recovery identifier and connection information separately determined by both parties; therefore, when the connection is abnormally interrupted, one of the two communication parties may initiate a connection recovery process, and resume communication using the connection information stored in the embodiment. In this way, both communication parties do not need to perform address collection, thereby accelerating connection recovery after abnormal disconnection.

Corresponding to the foregoing method embodiments, the embodiments of the present disclosure further provide corresponding apparatus and system embodiments.

Figure 7:
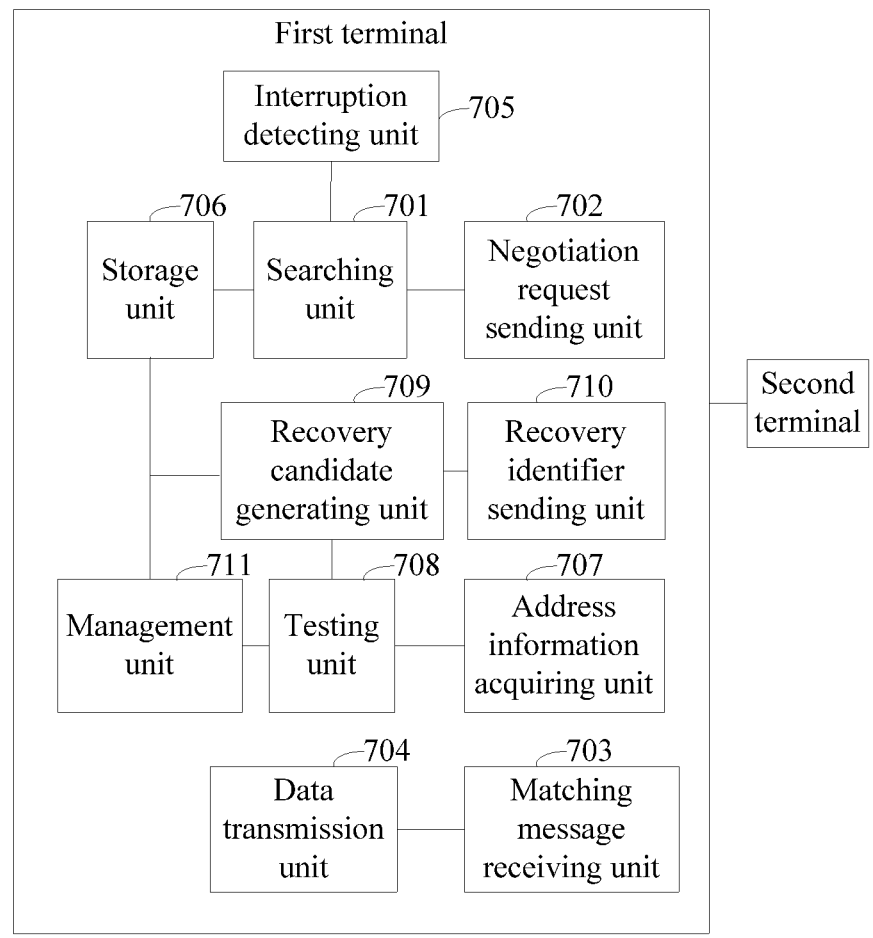
FIG. 7 is a schematic structural diagram of a connection recovery terminal according to an embodiment of the present disclosure.

As shown in FIG. 7, FIG. 7 is a schematic structural diagram of a connection recovery terminal according to an embodiment of the present disclosure, where the terminal includes a searching unit 701 configured to search for a recovery candidate corresponding to an interrupted connection, where the recovery candidate includes a recovery identifier and connection information; and use one found recovery candidate as a first recovery candidate, where the first recovery candidate includes a first recovery identifier and first connection information; a negotiation request sending unit 702 configured to send a negotiation request to a second terminal, where the negotiation request includes the first recovery identifier of the selected first recovery candidate; a matching message receiving unit 703 configured to receive a matching success message returned by the second terminal, where the matching success message is used to indicate that the second terminal finds a second recovery candidate that has a same recovery identifier as the first recovery candidate; and a data transmission unit 704 configured to transmit data to the second terminal according to the first connection information.

Further, the recovery candidate further includes generation time, and when a quantity of recovery candidates that are corresponding to the interrupted connection and found by the searching unit 701 is greater than or equal to two, the searching unit 701 is configured to use a recovery candidate with latest generation time as the first recovery candidate.

Further, the connection information includes a local-end address and port and a peer-end address and port that are required for data transmission, and the data transmission unit 704 is configured to extract a local-end address and port and a peer-end address and port from the first connection information, and transmit the data to the second terminal.

The terminal further includes an interruption detecting unit 705 configured to detect that a cause of interrupting the connection is abnormal disconnection, where a cause of the abnormal disconnection includes browser refreshing or a client software fault.

The terminal further includes a storage unit 706 configured to store the first recovery candidate corresponding to the connection.

Further, the terminal further includes an address information acquiring unit 707 configured to acquire local-end address information, and receive address information that is of the second terminal and sent by the second terminal; a testing unit 708 configured to initiate a connectivity test to the second terminal according to the address information that is of both parties and acquired by the address information acquiring unit 707, and select an optimal route as the first connection information of the connection; a recovery candidate generating unit 709 configured to generate the first recovery identifier for the first connection information, and store the first recovery identifier and the first connection information as the first recovery candidate; and a recovery identifier sending unit 710 configured to send the first recovery identifier to the second terminal, such that the second terminal uses the first recovery identifier as a recovery identifier corresponding to second connection information that is of the connection and acquired on a local end.

The recovery identifier sending unit 710 is configured to send the first recovery identifier to the second terminal using a STUN message.

The testing unit 708 is further configured to perform a connectivity test on the first connection information and the second connection information with the second terminal.

When a result of the connectivity test is a failure, the searching unit 701 is further configured to select another recovery candidate except the first recovery candidate to perform, with the second terminal, recovery candidate matching.

The terminal further includes a management unit 711 configured to manage, in at least one of the following manners, a recovery candidate stored in the storage unit: when the first terminal receives a matching failure message returned by the second terminal, deleting the first recovery candidate; deleting a recovery candidate whose connectivity test result is a failure; when the first terminal or the second terminal initiates an ICE Restart process to modify the connection information, updating connection information included in the stored recovery candidate to modified connection information; after a session between the first terminal and the second terminal is terminated, clearing a recovery candidate stored in a process of this session; setting a clearance period and keepalive duration, performing periodical clearance on the stored recovery candidate, and clearing, according to generation time of a recovery candidate, a recovery candidate with generation duration exceeding the keepalive duration; and after recovering the connection using the first recovery candidate, updating generation time of the first recovery candidate.

In the embodiment of the present disclosure, after a communication connection is interrupted, one of two communication parties initiates a connection recovery process, searches for a pre-stored first recovery candidate corresponding to the connection, acquires a first recovery identifier and first connection information from the first recovery candidate, and sends the first recovery identifier to a second terminal, such that the second terminal may find, according to the first recovery identifier, a second recovery candidate that has a same recovery identifier as the first recovery candidate, thereby completing recovery candidate negotiation between both communication parties, such that both parties may perform data transmission using the connection information in the recovery candidates determined by means of negotiation. Using the foregoing manner, in the embodiment of the present disclosure, two time-consuming operations, namely, an address collection process and a connectivity test on a collected valid address, do not need to be performed in a connection recovery process, that is, negotiation on a communicable address and port does not need to be performed, thereby accelerating connection recovery after abnormal disconnection.

Figure 8:
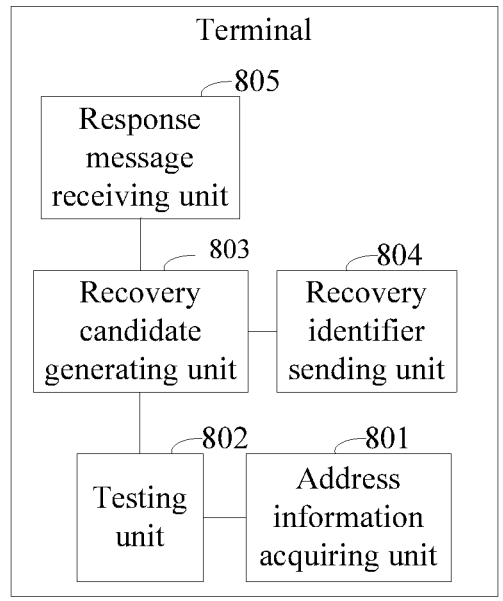
FIG. 8 is a schematic structural diagram of a terminal for generating a recovery candidate in a process of establishing a connection according to an embodiment of the present disclosure.

As shown in FIG. 8, FIG. 8 is a schematic structural diagram of a terminal for generating a recovery candidate in a process of establishing a connection according to an embodiment of the present disclosure, where the terminal includes an address information acquiring unit 801 configured to acquire local-end address information, send the acquired local-end address information to a second terminal, and receive address information that is of the second terminal and sent by the second terminal; a testing unit 802 configured to initiate a connectivity test according to the acquired address information of both parties, and select an optimal route as first connection information of the connection; a recovery candidate generating unit 803 configured to generate a first recovery identifier for the first connection information, and after a response message receiving unit 805 receives a response message returned by the second terminal, locally store the first recovery identifier and the first connection information as a first recovery candidate; a recovery identifier sending unit 804 configured to send the first recovery identifier to the second terminal, such that the second terminal uses the first recovery identifier as a recovery identifier corresponding to second connection information that is of the connection and acquired on a local end, where the second connection information is acquired by the second terminal in a process of the connectivity test; and the response message receiving unit 805 configured to receive the response message returned by the second terminal.

Figure 9:
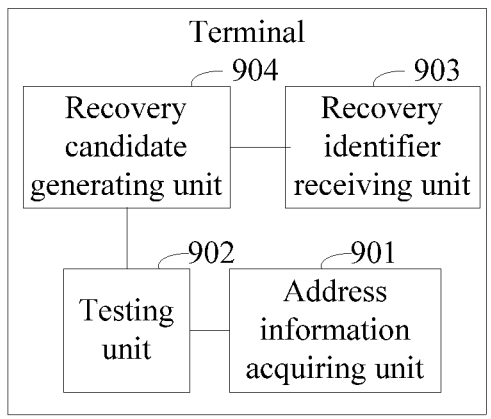
FIG. 9 is a schematic structural diagram of another terminal for generating a recovery candidate in a process of establishing a connection according to an embodiment of the present disclosure.

As shown in FIG. 9, FIG. 9 is a schematic structural diagram of another terminal for generating a recovery candidate in a process of establishing a connection according to an embodiment of the present disclosure, where the terminal includes an address information acquiring unit 901 configured to acquire local-end address information, send the acquired local-end address information to a first terminal, and receive address information that is of the first terminal and sent by the first terminal; a testing unit 902 configured to initiate a connectivity test according to the acquired address information of both parties, and select an optimal route as second connection information of the connection; a recovery identifier receiving unit 903 configured to receive a first recovery identifier sent by the first terminal, and use the first recovery identifier as a recovery identifier corresponding to the second connection information that is of the connection and acquired on a local end, where the first recovery identifier is a recovery identifier generated by the first terminal for acquired first connection information of the connection; and a recovery candidate generating unit 904 configured to locally store the first recovery identifier and the second connection information as a second recovery candidate.

The embodiment of the present disclosure provides a terminal for generating a recovery candidate in a process of establishing a connection, where a first terminal generates a recovery identifier for connection information corresponding to an optimal route determined by two parties in a connectivity test process, and sends the recovery identifier to a second terminal, such that the second terminal allocates the recovery identifier to connection information that is determined by a local end for the connection. Both communication parties store a recovery candidate, including the recovery identifier and connection information separately determined by both parties; therefore, when the connection is abnormally interrupted, one of the two communication parties may initiate a connection recovery process, and resume communication using the connection information stored in the embodiment. In this way, both communication parties do not need to perform address collection, thereby accelerating connection recovery after abnormal disconnection.

Figure 10:
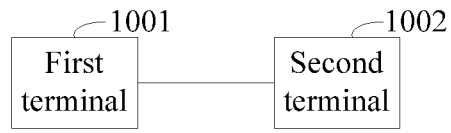
FIG. 10 is a schematic structural diagram of a connection recovery system according to an embodiment of the present disclosure.

As shown in FIG. 10, FIG. 10 is a schematic structural diagram of a connection recovery system according to an embodiment of the present disclosure, where the system includes a first terminal 1001 and a second terminal 1002.

The first terminal 1001 is configured to search for a recovery candidate corresponding to an interrupted connection, where the recovery candidate includes a recovery identifier and connection information; select one found recovery candidate as a first recovery candidate, where the first recovery candidate includes a first recovery identifier and first connection information; and send a negotiation request to the second terminal 1002, where the negotiation request includes the first recovery identifier of the selected first recovery candidate; the second terminal 1002 is configured to search for a second recovery candidate that has a same recovery identifier as the first recovery candidate, and return a matching success message to the first terminal 1001; and the first terminal 1001 and the second terminal 1002 transmit data to each other according to the first connection information and second connection information respectively.

The connection information includes a local-end address and port and a peer-end address and port that are required for data transmission, and the first terminal 1001 is further configured to extract a local-end address and port and a peer-end address and port from the first connection information, and transmit the data to the second terminal 1002.

The recovery candidate further includes an application identifier and a user identifier, and correspondingly, the negotiation request further includes a first application identifier and a first user identifier that are of the first recovery candidate, and the second recovery candidate further includes a second application identifier and a second user identifier.

The second terminal 1002 is further configured to search a stored record that matches the first application identifier and the first user identifier for the second recovery candidate that has the same recovery identifier as the first recovery candidate.

The first terminal 1001 stores the first recovery candidate corresponding to the connection, and the second terminal 1002 stores the second recovery candidate corresponding to the connection.

The first terminal 1001 is further configured to acquire local-end address information, send the acquired local-end address information to the second terminal 1002, and receive address information that is of the second terminal 1002 and sent by the second terminal 1002.

The second terminal 1002 is further configured to acquire local-end address information, send the acquired local-end address information to the first terminal 1001, and receive the address information that is of the first terminal 1001 and sent by the first terminal 1001.

The first terminal 1001 is further configured to initiate a connectivity test according to the acquired address information of both parties, and select an optimal route as the first connection information of the connection.

The second terminal 1002 is further configured to initiate a connectivity test according to the acquired address information of both parties, and select an optimal route as the second connection information of the connection.

The first terminal 1001 is further configured to generate the first recovery identifier for the first connection information, and send the first recovery identifier to the second terminal 1002.

The second terminal 1002 is further configured to receive the first recovery identifier sent by the first terminal 1001, use the first recovery identifier as a recovery identifier corresponding to the second connection information that is of the connection and acquired on a local end, locally store the first recovery identifier and the second connection information as the second recovery candidate, and send a response message to the first terminal 1001.

The first terminal 1001 is further configured to receive the response message returned by the second terminal 1002, and locally store the first recovery identifier and the first connection information as the first recovery candidate.

The first terminal 1001 and the second terminal 1002 are further configured to manage a stored recovery candidate in at least one of the following manners: deleting a recovery candidate whose connectivity test result is a failure; when the first terminal 1001 or the second terminal 1002 initiates an ICE Restart process to modify the connection information, updating connection information included in the stored recovery candidate to modified connection information; after a session between the first terminal 1001 and the second terminal 1002 is terminated, clearing a recovery candidate stored in a process of this session; setting a clearance period and keepalive duration, performing periodical clearance on the stored recovery candidate, and clearing, according to generation time of a recovery candidate, a recovery candidate with generation duration exceeding the keepalive duration; and after recovering the connection using the recovery candidate, updating generation time of the recovery candidate.

In the embodiment of the present disclosure, because the first terminal stores the recovery candidate corresponding to the abnormally interrupted connection, the first terminal does not need to access a STUN/TURN server to collect address information, thereby reducing pressure of the STUN/TURN server. When the connection of both parties is abnormally interrupted due to other causes such as a user misoperation or a client software fault, the first terminal may read the connection information included in the stored recovery candidate, and preferentially select the connection information for data transmission. Using the foregoing manner, in the embodiment of the present disclosure, two time-consuming operations, namely, an address collection process and a connectivity test on a collected valid address, do not need to be performed in a connection recovery process, thereby accelerating connection recovery after abnormal disconnection.

Figure 11:
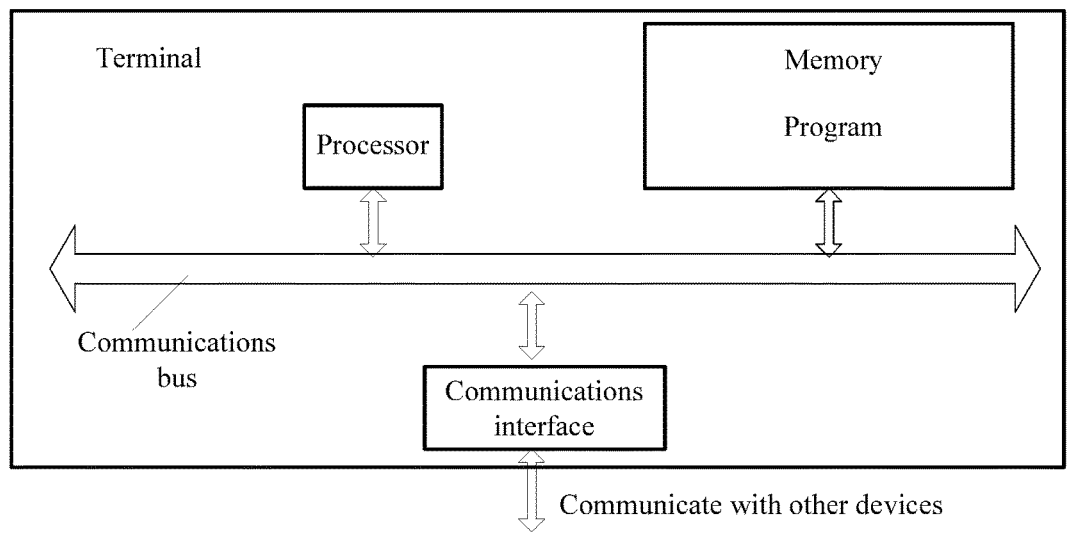
FIG. 11 is a schematic composition diagram of hardware of a terminal according to an embodiment of the present disclosure.

Further, as shown in FIG. 11, an embodiment of the present disclosure provides a schematic composition diagram of hardware of a terminal according to an embodiment of the present disclosure, which may include at least one processor (for example, a central processing unit (CPU)), at least one network interface or another communications interface, a memory, and at least one communications bus that is configured to implement connection communication between these apparatuses. The processor is configured to execute an executable module stored in the memory, for example, a computer program. The memory may include a high-speed random access memory (RAM), or may further include a non-volatile memory, for example, at least one magnetic disk memory. A communication connection between a system gateway and at least one other network element is implemented using at least one network interface (which may be wired or wireless), and the Internet, a wide area network, a local area network, a metropolitan area network, or the like may be used.

In some implementation manners, the memory stores a program instruction, where the program instruction may be executed by the processor, and the program instruction may include each unit indicated in the foregoing embodiments of the present disclosure. For an implementation manner of each unit, reference may be made to corresponding content in the foregoing embodiments of the present disclosure, and details are not repeatedly described herein.

Based on the foregoing descriptions of the implementation manners, a person skilled in the art may clearly understand that all or some of the steps of the methods in the embodiments may be implemented by software in addition to a necessary universal hardware platform. Based on such an understanding, the technical solutions of the present disclosure essentially, or the part contributing to the prior art may be implemented in the form of a software product. The computer software product may be stored in a storage medium, such as a read-only memory (ROM)/RAM, a magnetic disk, or an optical disc, and includes several instructions for instructing a computer device (which may be a personal computer, a resource management server, or a network communications device such as a media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present disclosure without creative efforts.

The foregoing descriptions are merely exemplary embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A connection recovery method, comprising:
searching, by a first terminal, for at least one recovery candidate corresponding to an interrupted connection, wherein the recovery candidate comprises connection information and a recovery identifier used to identify the connection information;
selecting, by the first terminal, one of the at least one recovery candidate as a first recovery candidate, wherein the first recovery candidate comprises a first recovery identifier and first connection information;
sending, by the first terminal, a negotiation request to a second terminal, wherein the negotiation request comprises the first recovery identifier of the first recovery candidate;
receiving, by the first terminal, a matching success message from the second terminal, wherein the matching success message is used to indicate that there is a second recovery candidate that has a same recovery identifier as the first recovery candidate; and
transmitting, by the first terminal, data to the second terminal according to the first connection information and after receiving the matching success message.

2. The method according to claim 1, wherein the recovery candidate further comprises a generation time, wherein the first recovery candidate is one of a plurality of recovery candidates with a latest generation time, and wherein a quantity of recovery candidates that are corresponding to the interrupted connection is greater than or equal to two.

3. The method according to claim 1, wherein the connection information comprises a local-end address and port and a peer-end address and port that are required for data transmission, and wherein transmitting, by the first terminal, the data to the second terminal according to the first connection information comprises extracting, by the first terminal, the local-end address and the port and a peer-end address and port from the first connection information, and transmitting the data to the second terminal.

4. The method according to claim 1, wherein the recovery candidate further comprises an application identifier and a user identifier, wherein the negotiation request further comprises a first application identifier and a first user identifier that are of the first recovery candidate, wherein the second recovery candidate further comprises a second application identifier and a second user identifier, wherein the method further comprises searching, by the second terminal, a stored record that matches the first application identifier and the first user identifier for the second recovery candidate that has the same recovery identifier as the first recovery candidate, and wherein a first user of a first application running on the first terminal performs, using a connection that is later interrupted to become the interrupted connection, data transmission with a second user of a second application running on the second terminal before the connection is interrupted.

5. The method according to claim 1, wherein the negotiation request further comprises a type attribute and an identifier field, wherein the type attribute is used to indicate that the negotiation request is used for connection recovery, wherein the identifier field is used to carry the recovery identifier of the first recovery candidate, wherein the negotiation request is an Offer message, and wherein the type attribute is an extended ice-options attribute.

6. The method according to claim 1, wherein the method further comprises at least one of the following recovery candidate modification manners:
  deleting, by the first terminal, the first recovery candidate when the first terminal receives a matching failure message from the second terminal;
  performing, by the first terminal, a connectivity test on any recovery candidate that succeeds in matching, and deleting any recovery candidate whose connectivity test result is a failure;
  clearing, by the first terminal, the recovery candidate stored during a session between the first terminal and the second terminal after the session is terminated;
  updating, by the first terminal, the connection information that is part of the at least one recovery candidate to modified connection information when the first terminal or the second terminal initiates an interactive connectivity establishment (ICE) Restart process to modify the connection information;
  setting a clearance period and keepalive duration, performing, by the first terminal or the second terminal, periodical clearance on the recovery candidate, and clearing, according to a generation time of the recovery candidate, the recovery candidate with generation duration exceeding the keepalive duration; and
  updating, by the first terminal, the generation time of the first recovery candidate after recovering the interrupted connection using the first recovery candidate.

7. The method according to claim 1, wherein the method further comprises initiating, by the first terminal, an interactive connection recovery ICE process to re-establish a connection between the first terminal and the second terminal when the first terminal cannot find the recovery candidate corresponding to the interrupted connection.

8. A connection recovery terminal, comprising:
a processor configured to:
  search for at least one recovery candidate corresponding to an interrupted connection, wherein the recovery candidate comprises connection information and a recovery identifier used to identify the connection information; and
  use one of the at least one recovery candidate as a first recovery candidate, wherein the first recovery candidate comprises a first recovery identifier and first connection information;
a transmitter coupled to the processor and configured to send a negotiation request to a second terminal, wherein the negotiation request comprises the first recovery identifier of the first recovery candidate; and
a receiver coupled to the processor and configured to receive a matching success message from the second terminal, wherein the matching success message is used to indicate that there is a second recovery candidate that has a same recovery identifier as the first recovery candidate,
wherein the transmitter is further configured to transmit data to the second terminal according to the first connection information.

9. The terminal according to claim 8, wherein the recovery candidate further comprises a generation time, wherein the processor is further configured to use the recovery candidate with a latest generation time as the first recovery candidate, and wherein a quantity of recovery candidates that are corresponding to the interrupted connection is greater than or equal to two.

10. The terminal according to claim 8, wherein the connection information comprises a local-end address and port and a peer-end address and port that are required for data transmission, and wherein the processor is further configured to extract the local-end address and port and the peer-end address and port from the first connection information, and wherein the transmitter is further configured to transmit the data to the second terminal.

11. The terminal according to claim 8, wherein the processor is further configured to manage the recovery candidate stored in a memory by:
  deleting the first recovery candidate when the terminal receives a matching failure message from the second terminal; or
  deleting any recovery candidate whose connectivity test result is a failure.

12. A connection recovery system, comprising:
a first terminal; and
a second terminal in communication with the first terminal,
wherein the first terminal is configured to:
  search for at least one recovery candidate corresponding to an interrupted connection, wherein the recovery candidate comprises connection information and a recovery identifier used to identify the connection information;
  select one of the at least one recovery candidates as a first recovery candidate, wherein the first recovery candidate comprises a first recovery identifier and first connection information; and
  send a negotiation request to the second terminal, wherein the negotiation request comprises the first recovery identifier of the first recovery candidate,
wherein the second terminal is configured to:

search for a second recovery candidate that has a same recovery identifier as the first recovery candidate; and return a matching success message to the first terminal, and wherein the first terminal and the second terminal transmit data to each other according to the first connection information and second connection information, respectively.

13. The system according to claim 12, wherein the connection information comprises a local-end address and port and a peer-end address and port that are required for data transmission, and wherein the first terminal is further configured to:

extract the local-end address and port and the peer-end address and port from the first connection information; and transmit the data to the second terminal.

14. The system according to claim 12, wherein the recovery candidate further comprises an application identifier and a user identifier, wherein the negotiation request further comprises a first application identifier and a first user identifier that are of the first recovery candidate, wherein the second recovery candidate further comprises a second application identifier and a second user identifier, and wherein the second terminal is further configured to search a stored record that matches the first application identifier and the first user identifier for the second recovery candidate that has the same recovery identifier as the first recovery candidate.

15. The system according to claim 12, wherein the first terminal stores the first recovery candidate corresponding to the interrupted connection, and wherein the second terminal stores the second recovery candidate corresponding to the interrupted connection.

16. The system according to claim 15, wherein the first terminal is further configured to:

acquire local-end address information;

send the local-end address information to the second terminal; and receive address information that is of the second terminal from the second terminal, wherein the second terminal is further configured to:

acquire the local-end address information;

send the local-end address information to the first terminal; and receive address information that is of the first terminal from the first terminal, wherein the first terminal is further configured to:

initiate a connectivity test according to the address information of the first terminal and the address information of the second terminal; and select an optimal route as the first connection information of the interrupted connection, wherein the second terminal is further configured to:

initiate a connectivity test according to the address information of the first terminal and the address information of the second terminal; and select an optimal route as the second connection information of the interrupted connection, wherein the first terminal is further configured to:

generate the first recovery identifier for the first connection information; and send the first recovery identifier to the second terminal, wherein the second terminal is further configured to:

receive the first recovery identifier from the first terminal;

use the first recovery identifier as a recovery identifier corresponding to the second connection information that is of the interrupted connection and on a local end;

locally store the first recovery identifier and the second connection information as the second recovery candidate; and send a response message to the first terminal, and wherein the first terminal is further configured to:

receive the response message from the second terminal; and locally store the first recovery identifier and the first connection information as the first recovery candidate.

17. The system according to claim 12, wherein the first terminal and the second terminal are further configured to manage the recovery candidate in at least one of the following manners:

deleting any recovery candidate whose connectivity test result is a failure;

updating the connection information that is part of the recovery candidate to modified connection information when the first terminal or the second terminal initiates an interactive connectivity establishment (ICE) Restart process to modify the connection information;

clearing any recovery candidate stored during a session between the first terminal and the second terminal after the session is terminated;

setting a clearance period and keepalive duration, performing periodical clearance on the recovery candidate, and clearing, according to a generation time of the recovery candidate, the recovery candidate with generation duration exceeding the keepalive duration; and updating the generation time of the recovery candidate after recovering the interrupted connection using the recovery candidate.

18. The terminal according to claim 8, wherein the processor is further configured to manage the recovery candidate stored in a memory by updating the connection information that is part of the recovery candidate to modified connection information when the terminal or the second terminal initiates an interactive connectivity establishment (ICE) Restart process to modify the connection information.

19. The terminal according to claim 8, wherein the processor is further configured to manage the recovery candidate stored in a memory by:

setting a clearance period and keepalive duration;

performing periodical clearance on the recovery candidate; and clearing, according to a generation time of the recovery candidate, the recovery candidate with generation duration exceeding the keepalive duration.

20. The terminal according to claim 8, wherein the processor is further configured to manage the recovery candidate stored in a memory by:

clearing the recovery candidate stored during a session between the terminal and the second terminal after the session is terminated; or updating a generation time of the first recovery candidate after recovering a connection that is later interrupted to become the interrupted connection using the first recovery candidate.

* * * * *